United States Patent
Abe

(10) Patent No.: US 7,495,709 B2
(45) Date of Patent: Feb. 24, 2009

(54) IMAGE DISPLAY APPARATUS AND IMAGE DISPLAY METHOD

(75) Inventor: Koichi Abe, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 609 days.

(21) Appl. No.: 11/173,191

(22) Filed: Jul. 1, 2005

(65) Prior Publication Data

US 2006/0012715 A1    Jan. 19, 2006

(30) Foreign Application Priority Data

Jul. 14, 2004    (JP) .............................. 2004-206714

(51) Int. Cl.
*H04N 9/74* (2006.01)
(52) U.S. Cl. .................................... 348/586
(58) Field of Classification Search ......... 348/584–589, 348/590–592, 597, 598, 600, 700; 375/240.08
See application file for complete search history.

(56) References Cited

U.S. PATENT DOCUMENTS

| | | | | |
|---|---|---|---|---|
| 5,606,376 A | * | 2/1997 | Shinohara | ................... 348/701 |
| 5,978,034 A | * | 11/1999 | Hosaka | ................... 375/240.16 |
| 6,360,168 B1 | | 3/2002 | Shimabara | |
| 6,954,498 B1 | * | 10/2005 | Lipton | ................... 375/240.08 |
| 6,980,699 B1 | * | 12/2005 | Okada | ........................ 382/284 |
| 7,221,778 B2 | * | 5/2007 | Kondo et al. | ................ 382/107 |

* cited by examiner

*Primary Examiner*—Paulos M Natnael
(74) *Attorney, Agent, or Firm*—Brinks Hofer Gilson & Lione

(57) ABSTRACT

An image display apparatus includes a background image selection unit for providing image data corresponding to a background image, a synthesis-target-image selection unit for providing image data corresponding to a different image to be superimposed on the background image, a motion vector detection unit for detecting a motion vector in the background image, a display position determination unit for determining a display position of the different image on the background image based on the detected motion vector, and an image combining unit for carrying out an image combining operation in which the different image is positioned at the determined display position and is superimposed over the background image.

16 Claims, 6 Drawing Sheets

| F1 | F2 |
|----|----|
| F5 | F7 |
| F6 | F8 |
| F3 | F4 |

IMAGE DISPLAY APPARATUS AND IMAGE DISPLAY METHOD

BACKGROUND OF THE INVENTION

1. Field of the Invention

The present invention relates to an image display apparatus and an image display method for displaying a different image superimposed over a background image, such as a moving picture.

2. Description of the Related Art

Display apparatuses including television receivers that display a child picture superimposed on part of a parent picture have been known (refer to, for example, Japanese Unexamined Patent Application Publication No. 2003-101462, in particular, pages 3 to 5 and FIGS. 1 to 9). In such display apparatuses, a parent picture is the background image and a child picture is displayed on a fixed region of the parent picture.

In the display apparatus disclosed in Japanese Unexamined Patent Application Publication No. 2003-101462, a child picture is displayed over the fixed region of the parent picture. Consequently, the image of the parent picture to be displayed in this region is hidden, and therefore, the visibility of the background image (i.e., the parent picture) is deteriorated. This problem occurs when a moving image and the like is displayed as a background image and when a different image, such as emergency information, is displayed on a part of the background image. Accordingly, this problem is inevitable as long as a different image is displayed without considering the content of the background image.

SUMMARY OF THE INVENTION

Accordingly, it is an object of the present invention to provide an image display apparatus and an image display method for increasing the visibility of an image when displaying a different image superimposed over a background image.

According to the present invention, an image display apparatus includes first image data input means for inputting first image data corresponding to a background image, second image data input means for inputting second image data corresponding to a different image superimposed on the background image, motion detection means for detecting a low-motion region in the background image, display position determination unit for determining a display position in the background image where the different image is to be superimposed based on the detection result from the motion detection means, image combining means for carrying out an image combining operation in which the different image is positioned at the display position determined by the display position determination means and is superimposed over the background image, and display means for displaying a combined image produced by the image combining means.

According to the present invention, an image display method superimposes a different image on a partial area of a background image. The image display method includes a first step for detecting a low-motion region in the background image, a second step for determining a display position in the background image where the different image is to be superimposed based on the detection result at the first step, and a third step for carrying out an image combining operation in which the different image is positioned at the display position determined at the second step and is superimposed over the background image.

The image display apparatus and image display method display a different image in a low-motion region of a background image, and therefore, the different image does not interfere in the display of the high-motion region of the background image. As a result, the visibility of the background image can be increased.

Preferably, the motion detection means compares pixel values of pixels forming the background image over a plurality of frames to detect a motion vector and detects a region where the value of the motion vector is smaller than or equal to a predetermined value. Detecting a motion vector allows a low-motion region in a background image to be easily extracted.

Preferably, the image combining process is carried out by the image combining means when a region detected by the motion detection means is larger than or equal to the size of the different image. Thus, the different image can be included in a low-motion region of a background image and is prevented from being superimposed on a relatively high-motion region of the background image.

Preferably, a priority is assigned to the different image in accordance with the content and the type of the different image, and the image combining means carries out the image combining operation when the priority is higher than or equal to a predetermined criterion and even when the region detected by the motion detection unit is smaller than the size of the different image. Thus, important information is displayed even when the information hides a high-motion region of the background image. Consequently, the important information can be reliably conveyed to a user.

Preferably, the image display apparatus further includes image reducing means for reducing the size of the different image when the region detected by the motion detection means is smaller than the size of the different image. Thus, a different image can be positioned in a low-motion region of a background image while maintaining the content.

Preferably, the display position determination means maintains the display position for a predetermined time period after the display position determination means determines the display position. Accordingly, even when a low-motion region in the background image frequently changes, the display position of a different image does not change in order to follow the change of the low-motion region. As a result, the decrease in visibility that occurs when the display position of a different image frequently changes can be prevented.

Preferably, the image combining means carries out an image combining operation in which the different image is faded in or faded out with respect to the background image for at least one of a time when the image combining means starts the image combining operation using the different image and a time when the image combining means terminates the image combining operation using the different image. This operation eliminates the visual unnaturalness by preventing the different image from suddenly appearing and disappearing on the background image. Additionally, since the display position of the different image is not fixed, the content of the background image hidden by the different image cannot be recognized if the different image suddenly appears. However, when the different image is faded in, the content of the background image can be recognized during the fade-in of the different image. Accordingly, the total visibility including the part to be hidden by the different image can be increased.

Preferably, the display position determination means determines the display position of the different image to be a position distant from the display center of the background image when the region detected by the motion detection means is larger than or equal to the size of the different image. Alternatively, when a plurality of regions detected by the motion detection means exist, the display position determination means preferably selects a region distant from the display center of the background image from among the plurality of regions and determines the display position of the different image in the selected region. Thus, the different image can be displayed in the periphery distant from the center of a screen. Consequently, the different image can be more naturally displayed by preventing the different image from being displayed in the vicinity of the center of the screen.

Preferably, when a plurality of regions detected by the motion detection means exist, the display position determination means selects a region having a higher priority assigned in advance from among the plurality of regions and determines the display position of the different image in the selected region. Thus, a desirable region for displaying the different image can be determined, and the different image can be displayed in that region.

Preferably, the display position determination means determines the display position of the different image to be a position corresponding to a region where the luminance is low when the region detected by the motion detection means is larger than or equal to the size of the different image. Alternatively, when a plurality of regions detected by the motion detection means exist, the display position determination means preferably selects a region where the luminance is low from among the plurality of regions and determines the display position of the different image in the selected region. Thus, the different image can be superimposed on a dark part of the background image. As a result, the visibility of the different image can be increased.

Preferably, the display position determination means determines the display position of the different image to be a position corresponding to a region where the luminance change is low when the region detected by the motion detection means is larger than or equal to the size of the different image. Alternatively, when a plurality of regions detected by the motion detection means exist, the display position determination means preferably selects a region where the luminance change is low from among the plurality of regions and determines the display position of the different image in the selected region. Thus, the different image can be superimposed on a monotonic image part of the background image. As a result, the visibility of the different image can be increased.

Preferably, the display position determination means determines the display position of the different image to be a position in an area excluding the periphery of the background image when the background image is combined with audio using a language other than a main language. In general, captions are displayed in the periphery of the background image. By setting the display position of the different image to avoid the periphery of the background image, the captions can be displayed without being hidden by the different image.

Preferably, the display position determination means does not carry out the operation to determine the display position of the different image to be a position in an area excluding the periphery of the background image when the background image does not contain a caption image representing the content of the audio. This allows the different image to be displayed in a wider area of the background image, including the periphery thereof, when the display of captions is turned off.

Preferably, when a plurality of different images to be combined exist, the image combining means selects a different image used for the image combining operation from among the plurality of different images based on the shape of the region detected by the motion detection means. Thus, the display position determination means can select a different image to be displayed for each shape of the low-motion region in the background image. As a result, the visibility of the different image can be increased. Also, screen images including various contents can be displayed.

DESCRIPTION OF THE PREFERRED EMBODIMENTS

An in-vehicle system according to an embodiment of the present invention is described in detail below with reference to the accompanying drawings.

Figure 1:
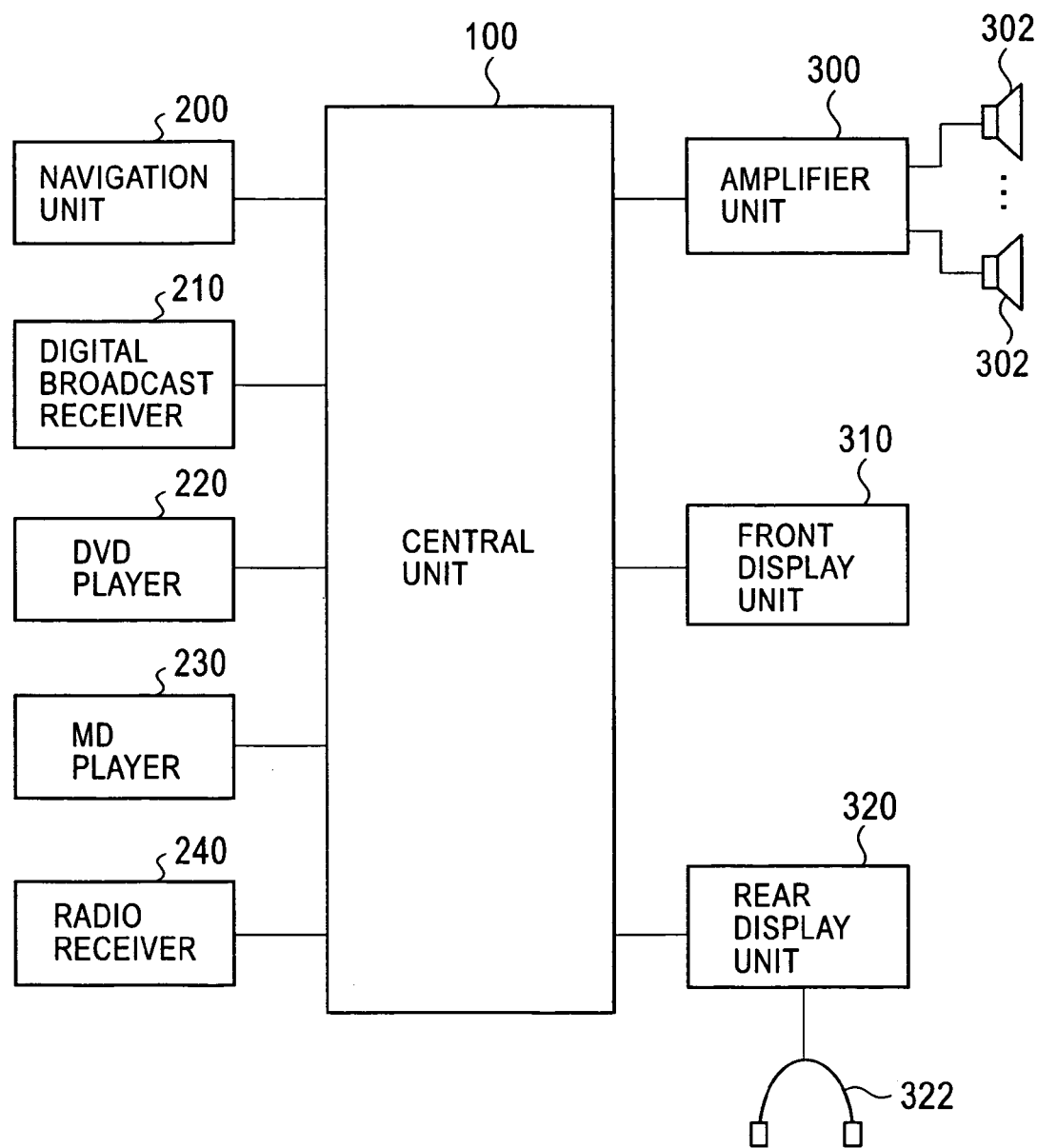
FIG. 1 is a block diagram of an in-vehicle system according to an embodiment of the present invention.

FIG. 1 is a block diagram of the in-vehicle system according to an embodiment of the present invention. As shown in FIG. 1, the in-vehicle system includes a central unit 100, a navigation unit 200, a digital broadcast receiver 210, a DVD (digital versatile disk) player 220, an MD (mini disc) player 230, a radio receiver 240, an amplifier unit 300, a front display unit 310, and a rear display unit 320.

Upon receiving image data or audio data from one of the navigation unit 200, the digital broadcast receiver 210, the DVD player 220, the MD player 230, and the radio receiver 240, the central unit 100 selectively provides the image data or audio data to the amplifier unit 300, the front display unit 310, and/or the rear display unit 320. Additionally, the central unit 100 superimposes a different image on a partial area of a background image. The central unit 100 is described in more detail below.

The navigation unit 200 detects the current location of the vehicle to display a map image of the area around the vehicle, searches for a route to a destination specified by a user, and navigates the user to the destination. For this purpose, the navigation unit 200 produces image data for displaying the map image and audio data for guiding at, for example, a traffic intersection. The digital broadcast receiver 210 receives a digital broadcast to produce image data including the broadcast moving image and audio data corresponding to the moving image. The DVD player 220 plays back and produces moving images and sound recorded in a loaded DVD. That is, the DVD player 220 produces image data representing the content of the recorded moving image and audio data corresponding to the image data. The MD player 230 plays back and produces audio data recorded in a loaded mini disc (MD).

The amplifier unit 300 amplifies an audio signal received from the central unit 100 and outputs it from a plurality of speakers 302 disposed at predetermined positions to the inside of a compartment of the vehicle. The front display unit 310 includes a display which a user sitting at a front side (front seat) of the compartment, such as a driver and a front-seat passenger, can view. The front display unit 310 is mounted at a predetermined position at the front side of the compartment of the vehicle. The rear display unit 320 includes a display which a user sitting at a rear side (rear seat) of the compartment can view. The front display unit 310 is mounted at a substantially central position between a driver seat and a front passenger seat. In addition, a headphone 322 is connected to the rear display unit 320 for users in a rear seat to individually listen to an audio signal supplied from the central unit 100.

Figure 2:
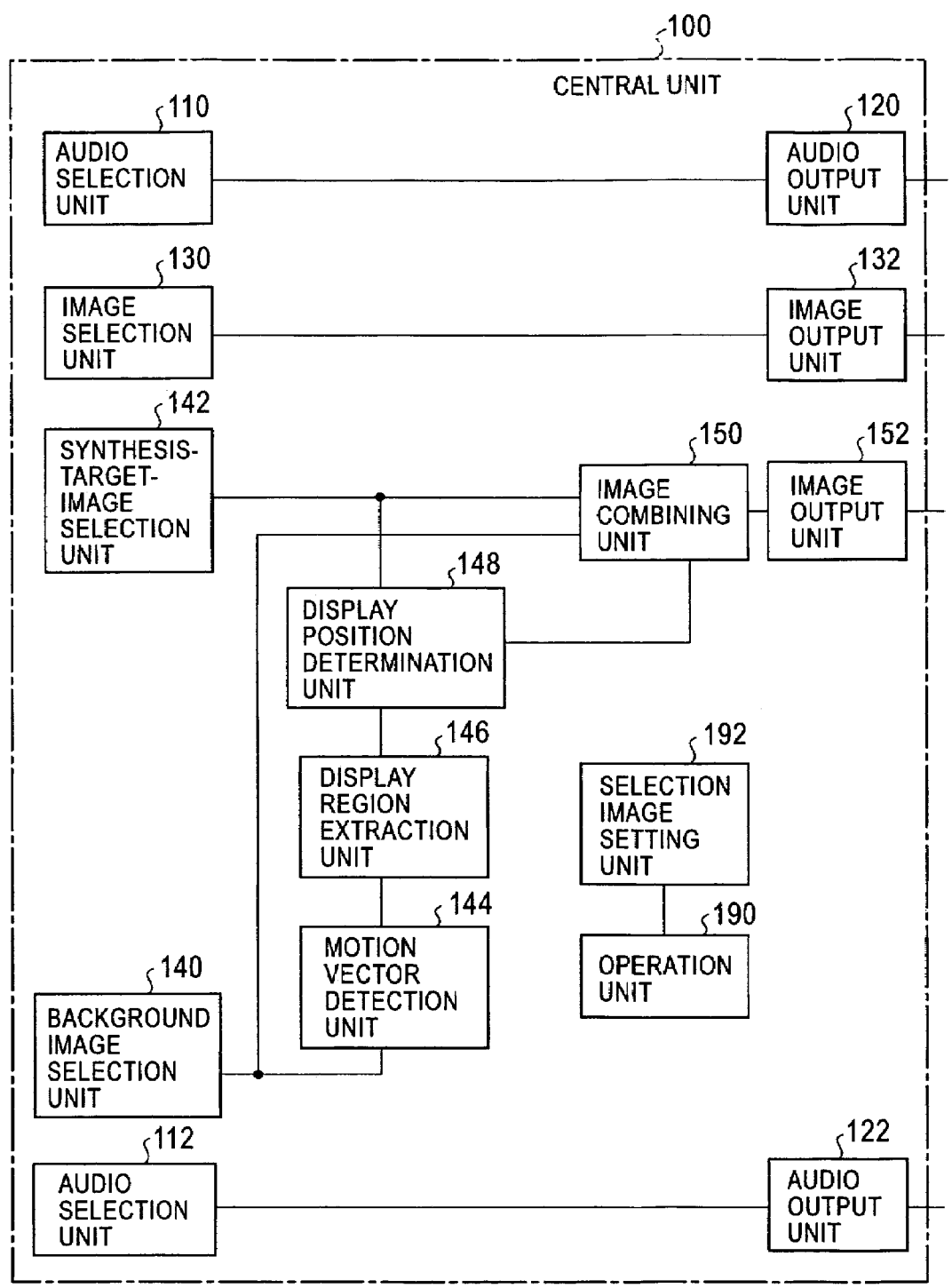
FIG. 2 is a detailed block diagram of a central unit.

FIG. 2 is a detailed block diagram of the central unit 100. As shown in FIG. 2, the central unit 100 includes audio selection units 110 and 112, audio output units 120 and 122, an image selection unit 130, image output units 132 and 152, a background image selection unit 140, a synthesis-target-image selection unit 142, a motion vector detection unit 144, a display region extraction unit 146, a display position determination unit 148, an image combining unit 150, an operation unit 190, and a selection image setting unit 192.

The audio selection unit 110 selects one of the audio data items to be supplied to the amplifier unit 300 from among audio data items supplied from the navigation unit 200. The audio output unit 120 converts the audio data item selected by the audio selection unit 110 to an audio signal and provides it to the amplifier unit 300.

Similarly, the audio selection unit 112 selects one of the audio data items to be supplied to the rear display unit 320 from among audio data items supplied from the navigation unit 200. The audio output unit 122 converts the audio data item selected by the audio selection unit 112 to an audio signal and provides it to the rear display unit 320.

The image selection unit 130 receives image data from the navigation unit 200, the digital broadcast receiver 210, the DVD player 220, the MD player 230, and the radio receiver 240, and selects one of the image data items to be supplied to the front display unit 310. The MD player 230 and the radio receiver 240 primarily provide audio data. Image data associated with an operation screen supplied from the MD player 230 and the radio receiver 240 are provided to the image selection unit 130. The image output unit 132 converts the image data selected by the image selection unit 130 to a video signal suitable for a display (e.g., an NTSC signal) and sends it to the front display unit 310. In this embodiment, one of the image data items received from the navigation unit 200, the digital broadcast receiver 210, the DVD player 220, the MD player 230, and the radio receiver 240 is selected and is converted to the corresponding video signal. The content of the video signal is displayed on the display in the front display unit 310.

The background image selection unit 140 receives image data from the navigation unit 200, the digital broadcast receiver 210, the DVD player 220, the MD player 230, and the radio receiver 240, and selects one of the image data items to be supplied to the rear display unit 320. The synthesis-target-image selection unit 142 retrieves a different image to be superimposed on a partial area of the background image (synthesis target image) and outputs it. In this embodiment, the image data selected by the background image selection unit 140 corresponds to the background image. On a partial area of the background image, one of different images received from the digital broadcast receiver 210, the DVD player 220, the MD player 230, and the radio receiver 240 is superimposed to form a combined display image. For example, while the DVD player 220 plays back a moving image as a background image, a traffic-intersection guiding image displayed by the route guiding operation of the navigation unit 200 may be superimposed on the background image as the different image. Alternatively, an image for displaying the title and artist name of music content played back by the MD player 230 may be superimposed on the background image.

The image combining unit 150 receives background image data corresponding to a background image selected by the background image selection unit 140 and synthesis target image data corresponding to a synthesis target image, namely, a different image selected by the synthesis-target-image selection unit 142. The image combining unit 150 then carries out an image combining operation in which the synthesis target image is superimposed at a predetermined position on the background image. Combined image data is supplied to the image output unit 152. The image output unit 152 then converts the combined image data to an appropriate video signal and sends it to the rear display unit 320.

In this embodiment, the position where the synthesis target image is superimposed by the image combining unit 150 is changed depending on the amount of motion in the background image. For this purpose, the motion vector detection unit 144, the display region extraction unit 146, and the display position determination unit 148 are provided. The motion vector detection unit 144 detects the motion vector distribution (optical flow) based on image data of a plurality of frames contained in the background image selected by the background image selection unit 140. To detect motion vectors, a known method, for example, the spacio-temporal gradient method, the correlation method, or the block-matching algorithm, can be employed. The display region extraction unit 146 extracts a region where the size of the motion vector detected by the motion vector detection unit 144 is smaller than or equal to a predetermined value as a displayable region for the synthesis target image. The display position determination unit 148 determines the display position of the synthesis target image based on the displayable region extracted by the display region extraction unit 146. The image combining unit 150 carries out an image combining operation so that the synthesis target image is positioned at the determined display position on the background image.

The operation unit 190 is used by a user to specify background images displayed on the front display unit 310 and the rear display unit 320 and a synthesis target image to be combined with the background image displayed on the rear display unit 320. The selection image setting unit 192 determines input sources for images selected by the image selection unit 130, the background image selection unit 140, and the synthesis-target-image selection unit 142, based on an instruction entered by the user via the operation unit 190. By appropriately setting the selection image setting unit 192 in response to the user instruction via the operation unit 190, when a moving image played back by the DVD player 220 is displayed as a background image, as described above, an intersection guide image supplied from a route guiding operation of the navigation unit 200 can be superimposed on the moving image as an information image. Also, an information image indicating the title and artist name of music content played back by the MD player 230 can be superimposed on the moving image.

The above-described background image selection unit 140 and synthesis-target-image selection unit 142 correspond to first image data input means and second image data input means, respectively. The motion vector detection unit 144 corresponds to motion detection means. The display region extraction unit 146 and the display position determination unit 148 correspond to display position determination means.

The image combining unit 150 corresponds to image combining means. The image output unit 152 corresponds to display means.

According to one embodiment of the present invention, the in-vehicle system has the above-described configuration. The image combining operation is described next, in which a different image is superimposed on a partial area of a moving image representing a background image.

Figure 3:
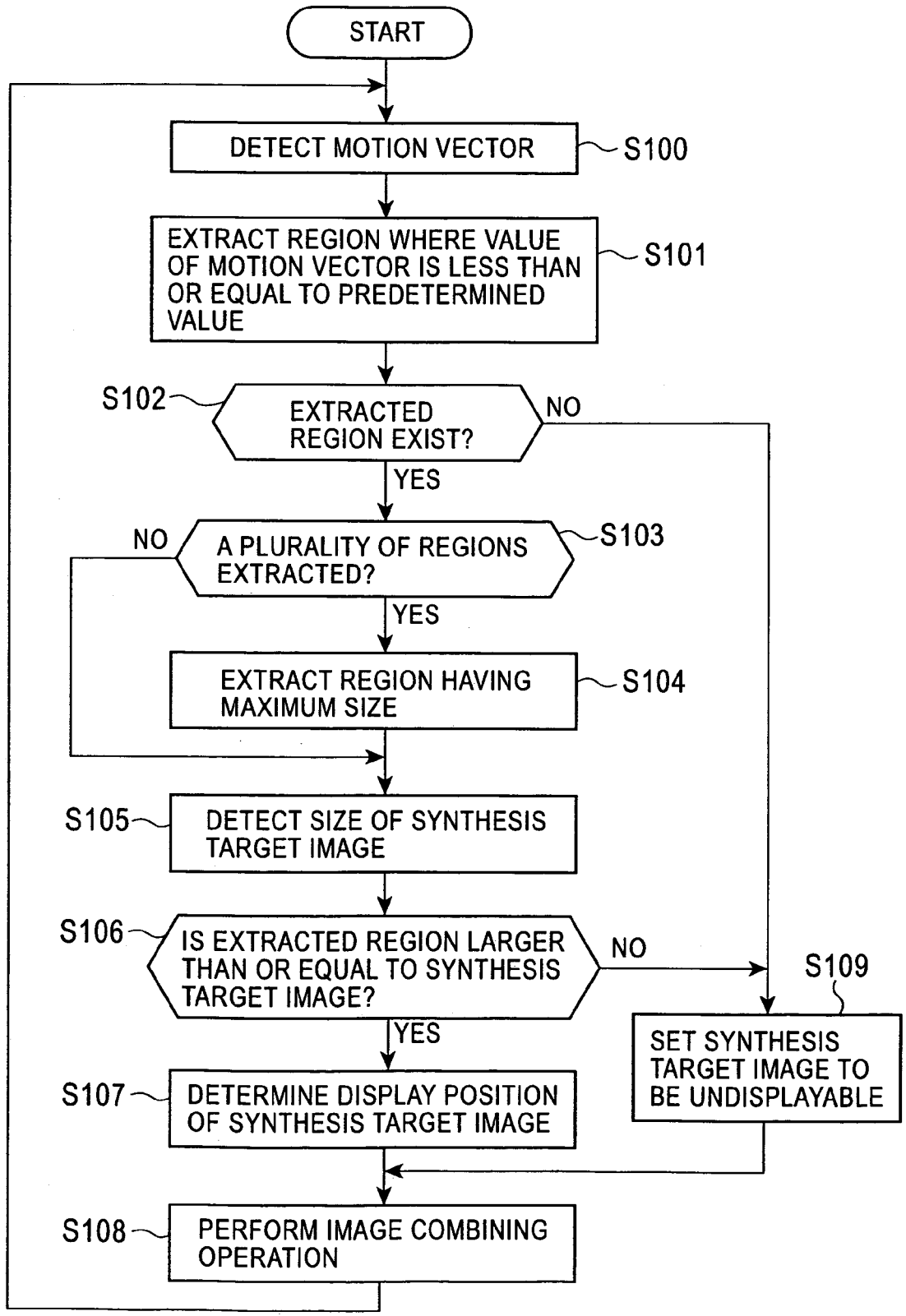
FIG. 3 is a flow chart of an image combining operation in which an information image is superimposed on a background image.

FIG. 3 is a flow chart of the image combining operation in which a different image is superimposed on a background image. The motion vector detection unit 144 detects a motion vector of a moving image representing a background image selected by the background image selection unit 140 (step S100). The display region extraction unit 146 extracts a region where the value of the detected motion vector is less than or equal to a predetermined value (step S101).

Subsequently, the display position determination unit 148 determines whether a displayable region extracted by the display region extraction unit 146 exists (step S102). If a displayable region exists, then it is determined whether a plurality of the displayable regions exist (step S103). If a plurality of the displayable regions exist, the display position determination unit 148 extracts a region having the maximum size from among the plurality of displayable regions (step S104). After step S104, or after it is determined at step S103 that only one displayable area exists, the display position determination unit 148 detects the size of the synthesis target image selected by the synthesis-target-image selection unit 142 (step S105), and then determines whether the extracted displayable area is larger than or equal to the size of the synthesis target image (step S106). If the extracted displayable area is larger than or equal to the size of the synthesis target image, the display position determination unit 148 determines the display position of the synthesis target image in accordance with the position of the displayable area (step S107). Thereafter, the image combining unit 150 carries out an image combining operation so that the synthesis target image is superimposed at the determined display position on the background image (step S108).

If it is determined at step S102 that no displayable region exists (i.e., in the case where the motion of the entire background image is very fast) or if it is determined at 106 that the extracted displayable region is smaller than the size of the synthesis target image, the display position determination unit 148 sets the synthesis target image to be undisplayable (step S109).

As described above, in the in-car system according to this embodiment, a different image (synthesis target image) is displayed in a low-motion region of a background image, and therefore, the different image does not hide a moving part in the background image. As a result, the visibility of the background image can be increased. In particular, by detecting a motion vector, a low-motion region of the background image can be easily detected.

In addition, since the image combining operation is carried out only when the low-motion region of a background image is larger than or equal to the size of a different image, the different image can be reliably contained in the low-motion region of the background image. As a result, part of the different image is prevented from overlapping a high-motion region of the background image.

In the foregoing description, if the displayable region is smaller than the size of the synthesis target image, the synthesis target image is set to be undisplayable. However, the synthesis target image may be reduced in size to be displayed in the displayable region. In addition, if the display position determined by the display position determination unit 148 is changed in a short period of time, the position in a moving image frequently changes, and therefore, the visibility decreases. Accordingly, once the display position is determined, the display position may be maintained for a certain period of time.

Figure 4:
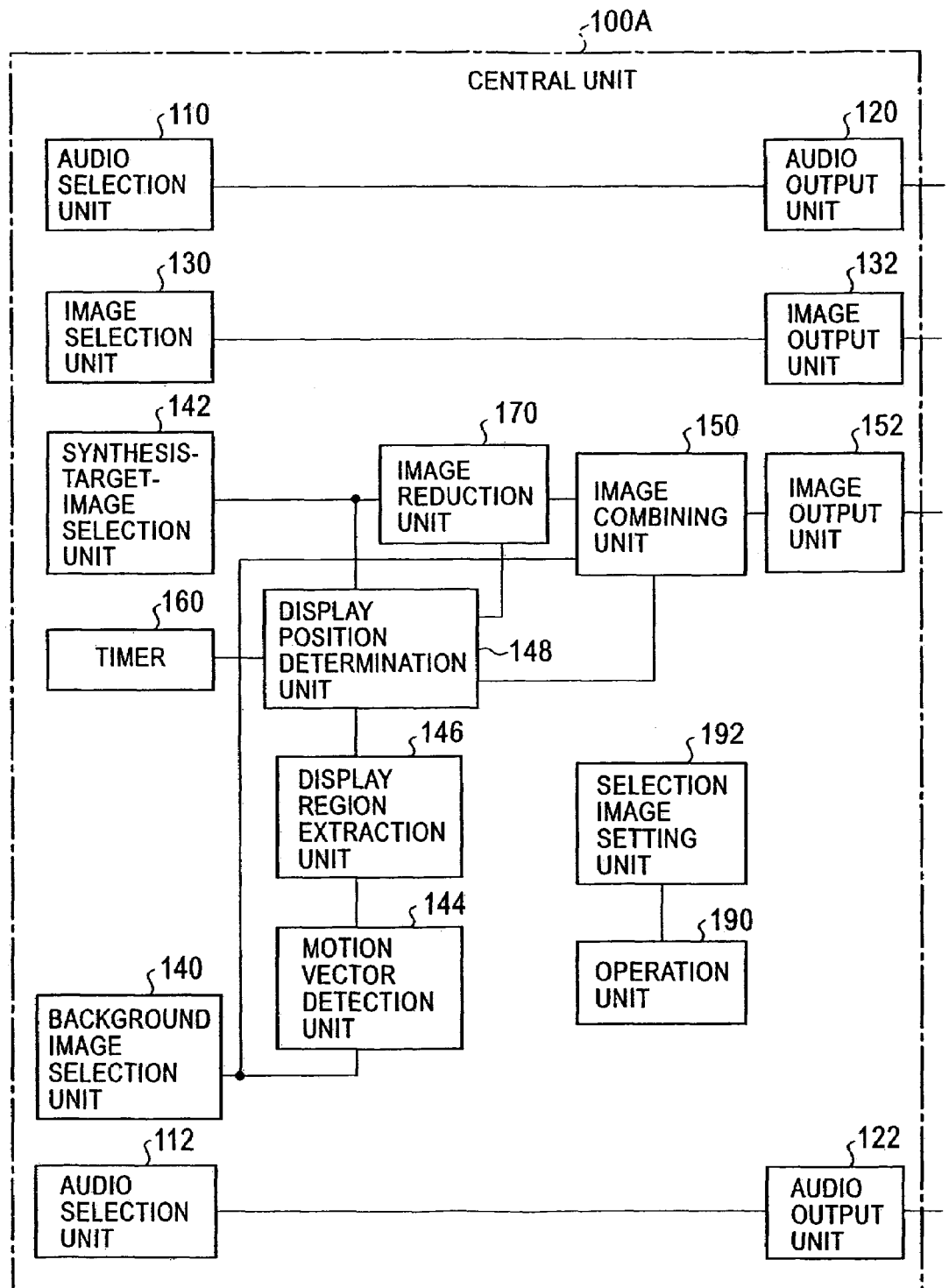
FIG. 4 is a diagram illustrating a modification of the central unit.

FIG. 4 is a block diagram of a central unit 100A, which is a modification of the central unit 100 in consideration of these situations. The central unit 100A shown in FIG. 4 differs from the central unit 100 shown in FIG. 2 in that the central unit 100A includes a timer 160 and an image reduction unit 170 functioning as an image reduction means. The image reduction unit 170 reduces the size of a synthesis target image in accordance with the size of a displayable region. The timer 160 measures a predetermined time period starting from a time when the display position determination unit 148 determines the display position.

Figure 5:
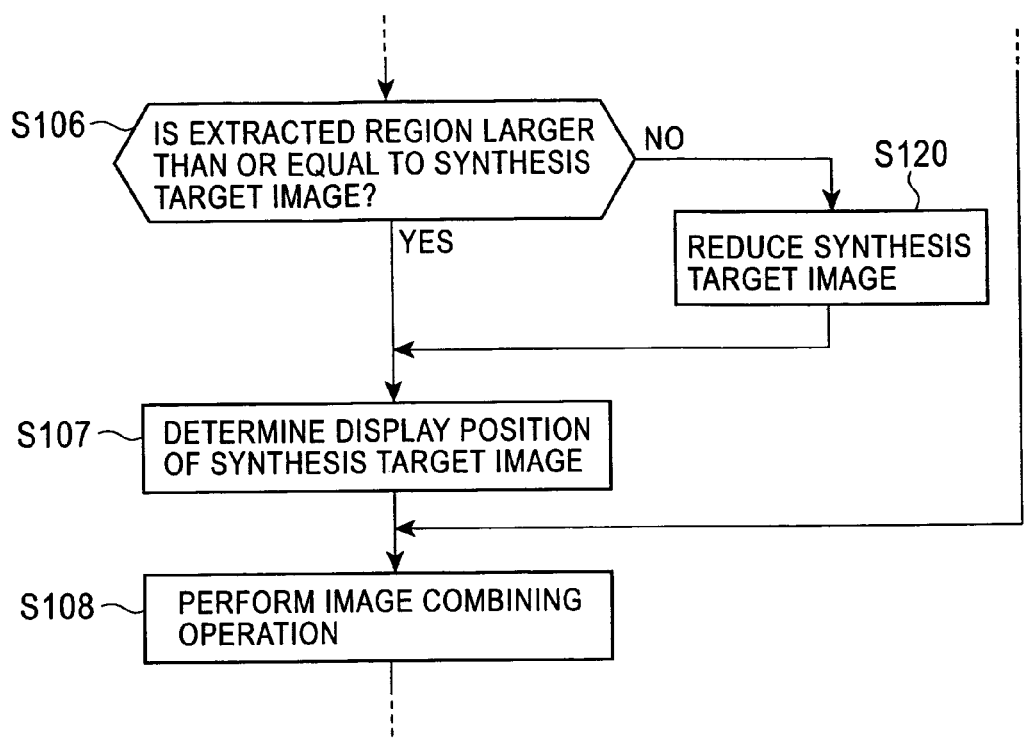
FIG. 5 is a flow chart illustrating a modification of the operation by the central unit shown in FIG. 4.

FIG. 5 is a flow chart illustrating the modified operation by the central unit 100A shown in FIG. 4. In FIG. 5, only the steps different from those shown in FIG. 3 are shown. If the extracted displayable region is smaller than the size of the synthesis target image, it is determined at step S106 that the answer is no. Subsequently, the image reduction unit 170 reduces the synthesis target image so that the synthesis target image fits in the displayable region (step S120). Thereafter, the process proceeds to step S107, where the display position determination unit 148 determines the display position. Since the reduction process of the synthesis target image is carried out when a synthesis target image is larger than a displayable region, a different image can be displayed in a low-motion region of a background image without losing the content of the synthesis target image.

Figure 6:
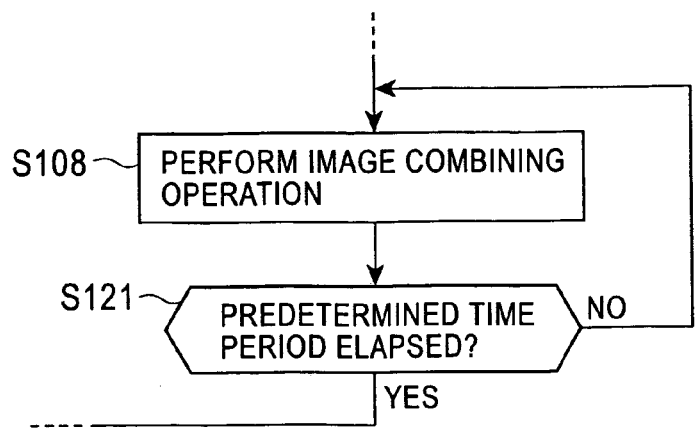
FIG. 6 is a flow chart illustrating another modification of the operation by the central unit shown in FIG. 4.

FIG. 6 is a flow chart illustrating another modification of the operation by the central unit 100A shown in FIG. 4. In FIG. 6, only the steps different from those shown in FIG. 3 are shown. After the display position determination unit 148 determines the display position and the image combining unit 150 combines the images (step S108), the display position determination unit 148 determines whether a predetermined time period has elapsed (step S121). The timer 160 measures the predetermined time period. If the display position determination unit 148 determines that the answer is no, the image combining operation at step S108 continues until the predetermined time period has elapsed. During this period, since a new motion vector is not detected and the display position of the synthesis target image is maintained, the synthesis target image (information image) is displayed at the same position in the background image. Accordingly, even when a low-motion region in the background image frequently changes, the display position of the synthesis target image does not change in order to follow the change of the low-motion region. As a result, the decrease in visibility that occurs when the display position of the synthesis target image frequently changes can be prevented.

It will be understood by those skilled in the art that the present invention is not limited to the above-described embodiments, and numerous and various modifications can be made without departing from the spirit of the present invention. In the above-described embodiments, the DVD player 220, the central unit 100, and the rear display unit 320 are assembled to form an in-vehicle system that displays a different image combined with a background image. However, these functions may be integrated into one function. For example, a DVD player capable of playing back a movie recorded in a DVD by connecting a display unit to the DVD player may have the function of the central unit 100, that is, the function to combine a different image with a background image. Thus, if the system can be flexibly configured, as described above, the present invention can be applied to, for example, the following cases: a cell phone which combines a different image with a delivered moving image and displays it; and an in-vehicle terminal which combines a different image with received video captured by another vehicle and transmitted from the vehicle using vehicle-to-vehicle communication and which then displays the combined image.

In the above-described embodiments, the content of the different image superimposed on the background image is not described. Examples of the different image include the following for each device supplying the different image.

<Navigation Unit>

(a) When a navigation unit detects traffic congestion information from a VICS (Vehicle Information and Communication System), the navigation unit displays a simplified map defined by the VICS as level 2 on a background image as the different image.

(b) When a vehicle is traveling on a route found by a route search and when the estimated arrival time significantly changes, the delay information and a new estimated arrival time are displayed on a background image as the different image.

(c) When a vehicle is traveling on a route found by a route search and when the vehicle approaches an intersection where the vehicle is to turn to the right or the left, a magnified map of the intersection is displayed on a background image as the different image. By viewing the display, a user can hold on as the vehicle tilts when the vehicle turns to the right or the left.

(d) When a vehicle is traveling on a road and when the vehicle approaches a tight turn, this information is displayed on a background image as the different image.

(e) When a vehicle is traveling on a highway and when the vehicle approaches a service area or a parking area, a different image asking whether or not a passenger wants to stop to take a rest is displayed on a background image, for example, on the rear display unit 320.

<FM Multiple Telecasting Receiver>

(a) Text weather information (b) Text news (c) Text traffic congestion information defined by the VICS as level 1

<Digital Broadcast Receiver>

(a) The title of a currently received program (b) The names of actors and actresses in each scene of a currently received program (i.e., the names of actors and actresses in the current screen)

<In-Vehicle Terminal for Vehicle-to-Vehicle Communication>

(a) When detecting traffic congestion, an in-vehicle terminal receives an image of the traffic congestion captured by a camera on another vehicle via vehicle-to-vehicle communication and displays the image on a background image as the different image.

(b) Upon receiving a signal communicating a sudden brake operation of a vehicle ahead of the vehicle, an in-vehicle terminal displays the different image representing a predetermined alarm on a background image.

<Cell Phone>

(a) In the case of a cell phone having a communication function complying with the Bluetooth™ specification, or in the case of a cell phone having a wired communication function, when the cell phone receives a call, a different image indicating the telephone number of a caller is displayed on a background image.

<Hot Spot in LAN>

(a) If stores in the vicinity of the current location distribute advertisement information, the advertisement information is displayed on a background image as the different image.

<DVD Player>

(a) The title and capture information of a program currently played back is displayed on a background image as the different image. In this case, if the background image is a moving image, such as video, played back by the DVD player, the same source supplying device supplies both the background image and the different image.

<Other Device>

(a) A portable audio player (e.g., an MP3 player) displays the title and name of a musician of a music piece currently played back on the background image as the different image.

(b) Operation menu screens of various devices are displayed on a background image as the different images.

In the above-described embodiments, the image combining operation is carried out when the displayable region in the background image is larger than or equal to the different image. However, the image combining operation may be carried out even when the displayable region in the background image is smaller than the different image. In addition, the following modifications can be made when considering the relationship between the displayable region and the different image.

(Modification 1)

The different image has a priority depending on the content and the type. If the priority is higher than or equal to a predetermined criterion, the image combining operation is carried out even when the displayable region is smaller than the different image. Thus, important information is displayed even when the information hides a high-motion area of the background image. Consequently, the important information can be reliably communicated to a user.

(Modification 2)

When the displayable region is larger than or equal to the different image, the different image is displayed at a position distant from the center of the background image. Alternatively, when a plurality of displayable regions exist, the displayable region farthest from the center of the background image is selected from among the plurality of displayable regions to determine the display position of the different image. Thus, the different image can be displayed in the periphery distant from the center of a screen. Consequently, the different image can be more naturally displayed by preventing the different image from being displayed in the vicinity of the center of the screen.

(Modification 3)

Figures 7, 8:
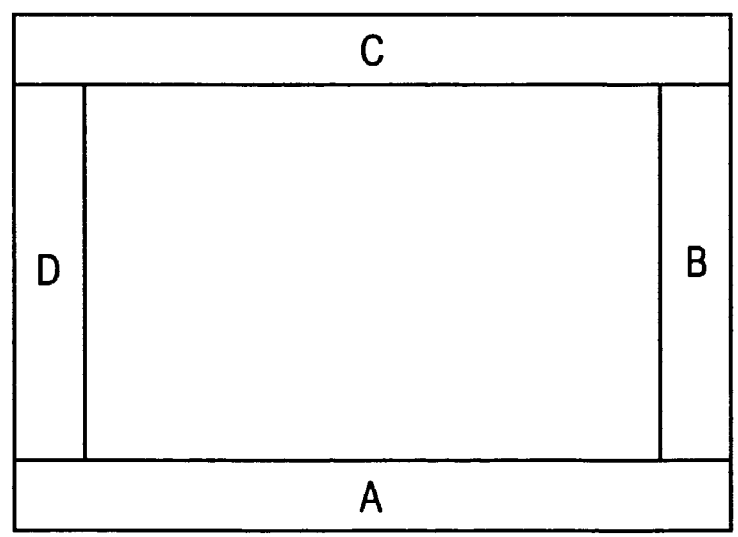
FIG. 7 is a diagram illustrating a modification of the process of determining a display position.
FIG. 8 is a diagram illustrating a modification of the process of determining a display position.

When a plurality of displayable regions exist, partitions of the background image having predetermined higher priorities are selected from among the plurality of partitions to determine the display position of the different image. For example, as shown in FIG. 7, eight partitions F1 to F8 are formed in the background image. The priorities of the partitions F1, F2, F3, F4, F5, F6, F7 and F8 are in descending order (i.e., the priority of the partition F1 is the highest). In such a case, if one displayable region is contained in the partition F1 and the other displayable region is contained in the partition F6, the displayable region contained in partition F1, which has a higher priority, is selected to determine the display position of the different image. Thus, a desirable partition for displaying the different image can be determined and the different image can be displayed in that partition.

(Modification 4)

When a displayable region is larger than or equal to a different image, the different image is displayed at a position having low luminance. Alternatively, when a plurality of displayable regions exist, a displayable region having low luminance is selected from among the plurality of the displayable regions to determine the display position of the different image. Thus, the different image can be superimposed on a dark part of the background image. As a result, the visibility of the different image can be increased.

(Modification 5)

When a displayable region is larger than or equal to a different image, the different image is displayed at a position having a low luminance change. Alternatively, when a plurality of displayable regions exist, a displayable region having a low luminance change is selected from among the plurality of the displayable regions to determine the display position of the different image. Thus, the different image can be superimposed on a monotonic image part of the background image. As a result, the visibility of the different image can be increased.

(Modification 6)

On a background image combined with speech using a language other than a main language (for example, in Japan, the main language is Japanese and a background image is a video, such as a movie, having English dialogue), the different image is displayed in an area other than the periphery of the background image. For example, as shown in FIG. 8, four areas A, B, C, and D are formed in the periphery of the background image. The different image is displayed such that the different image does not overlap these four areas. In general, captions are displayed in the periphery of the background image. By setting the display position of the different image to avoid the periphery of the background image, the captions can be displayed without being hidden by the different image.

Even when captions are set to be displayable, it is desirable that the display position of the different image is not set to be a position excluding the periphery of the background image if the background image contains no captions (for example, if the display of captions is turned off during playback of a movie on a DVD player). This allows the different image to be displayed in a wider area of the background image, including the periphery thereof, when the display of captions is turned off.

(Modification 7)

When a plurality of different images, which are the synthesis target images, exist, a different image used for an image combining operation is selected from among the plurality of different images in accordance with the shape of a displayable region. For example, a simplified map image is supplied from the navigation unit 200 as a different image and a text weather forecast is also supplied from the radio receiver 240 supporting a multiplex telecasting broadcast as a different image. In order to display the simplified map image, a displayable region having a shape of a square or a rectangle close to a square is desirable. On the other hand, in order to display the text weather forecast, a displayable region having a shape of a horizontally elongated rectangle is desirable. The display position determination unit 148 determines the shape of the displayable region extracted by the display region extraction unit 146 and then selects a different image suitable for the determined shape. Thus, the display position determination unit 148 can select a different image as a synthesis target image for each shape of the low-motion area in the background image. As a result, the visibility of the different image can be increased. Also, screen images including various contents can be displayed.

(Modification 8)

The image combining unit 150 carries out an image combining operation so that the different image is faded in or faded out with respect to the background image for at least one of a time when the image combining unit 150 starts the image combining operation and a time when the image combining unit 150 terminates the image combining operation. As used herein, the term "faded in" is referred to as a process in which the different image gradually appears on the background image. In contrast, the term "faded out" is referred to as a process in which the different image gradually disappears from the background image. By gradually changing the transparency of the different image, the fade-in or fade-out process can be achieved. These operations eliminate the visual unnaturalness by preventing the different image from suddenly appearing and disappearing on the background image. Additionally, since the display position of the different image is not fixed, the content of the background image hidden by the different image cannot be recognized if the different image suddenly appears. However, when the different image is faded in, the content of the background image can be recognized during the fade-in of the different image. Accordingly, the total visibility including the part to be hidden by the different image can be increased.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An image display apparatus comprising:
   a first image data input unit for providing first image data corresponding to a background image;
   a second image data input unit for providing second image data corresponding to a different image to be superimposed on the background image;
   a motion detection unit for detecting a low-motion region in the background image;
   a display position determination unit for determining a display position on the background image where the different image is to be combined based on the detection result from the motion detection unit;
   an image combining unit for carrying out an image combining operation in which the different image is positioned at the display position determined by the display position determination unit and is superimposed over the background image; and
   a display unit for displaying an image combined by the image combining unit;
   wherein the image combining unit carries out the image combining operation when the region detected by the motion detection unit is larger than or equal to the size of the different image.

2. The image display apparatus according to claim 1, wherein the motion detection unit compares pixel values of pixels forming the background image over a plurality of frames to detect a motion vector and wherein the motion detection unit detects a region where the value of the motion vector is smaller than or equal to a predetermined value.

3. The image display apparatus according to claim 1, wherein a priority is assigned to the different image and wherein the image combining unit carries out the image combining operation when the priority is higher than or equal to a predetermined criterion and even when the region detected by the motion detection unit is smaller than the size of the different image.

4. The image display apparatus according to claim 1, further comprising:
an image reducing unit for reducing the size of the different image when the region detected by the motion detection unit is smaller than the size of the different image.

5. The image display apparatus according to claim 1, wherein the display position determination unit maintains the display position for a predetermined time period after the display position determination unit determines the display position.

6. The image display apparatus according to claim 1, wherein the image combining unit carries out an image combining operation in which the different image is faded in/out with respect to the background image for at least one of a time when the image combining unit starts the image combining operation using the different image and a time when the image combining unit terminates the image combining operation using the different image.

7. The image display apparatus according to claim 1, wherein the display position determination unit determines the display position of the different image to be a position distant from the display center of the background image when the region detected by the motion detection unit is larger than or equal to the size of the different image.

8. The image display apparatus according to claim 1, wherein, when a plurality of regions detected by the motion detection unit exist, the display position determination unit selects a region distant from the display center of the background image from among the plurality of regions and determines the display position of the different image in the selected region.

9. The image display apparatus according to claim 1, wherein, when a plurality of regions detected by the motion detection unit exist, the display position determination unit selects a region in a display partition having a higher pre-assigned priority from among the plurality of regions and determines the display position of the different image in the selected region.

10. The image display apparatus according to claim 1, wherein the display position determination unit determines the display position of the different image to be a position corresponding to a region where the luminance is low when the region detected by the motion detection unit is larger than or equal to the size of the different image.

11. The image display apparatus according to claim 1, wherein, when a plurality of regions detected by the motion detection unit exist, the display position determination unit selects a region where the luminance is low from among the plurality of regions and determines the display position of the different image in the selected region.

12. The image display apparatus according to claim 1, wherein the display position determination unit determines the display position of the different image to be a position corresponding to a region where the luminance change is low when the region detected by the motion detection unit is larger than or equal to the size of the different image.

13. The image display apparatus according to claim 1, wherein, when a plurality of regions detected by the motion detection unit exist, the display position determination unit selects a region where the luminance change is low from among the plurality of regions and determines the display position of the different image in the selected region.

14. The image display apparatus according to claim 1, wherein, when a plurality of different images to be combined exist, the image combining unit selects a different image used for the image combining operation from among the plurality of different images based on the shape of the region detected by the motion detection unit.

15. An image display apparatus comprising:
a first image data input unit for providing first image data corresponding to a background image;
a second image data input unit for providing second image data corresponding to a different image to be superimposed on the background image;
a motion detection unit for detecting a low-motion region in the background image;
a display position determination unit for determining a display position on the background image where the different image is to be combined based on the detection result from the motion detection unit;
an image combining unit for carrying out an image combining operation in which the different image is positioned at the display position determined by the display position determination unit and is superimposed over the background image; and
a display unit for displaying an image combined by the image combining unit;
wherein the display position determination unit determines the display position of the different image to be a position in an area excluding the periphery of the background image when the background image is combined with audio using a language other than a main language.

16. The image display apparatus according to claim 15, wherein the display position determination unit does not carry out the operation to determine the display position of the different image to be a position in an area excluding the periphery of the background image when the background image does not contain a caption image representing the content of the audio.

* * * * *